United States Patent Office 3,087,902
Patented Apr. 30, 1963

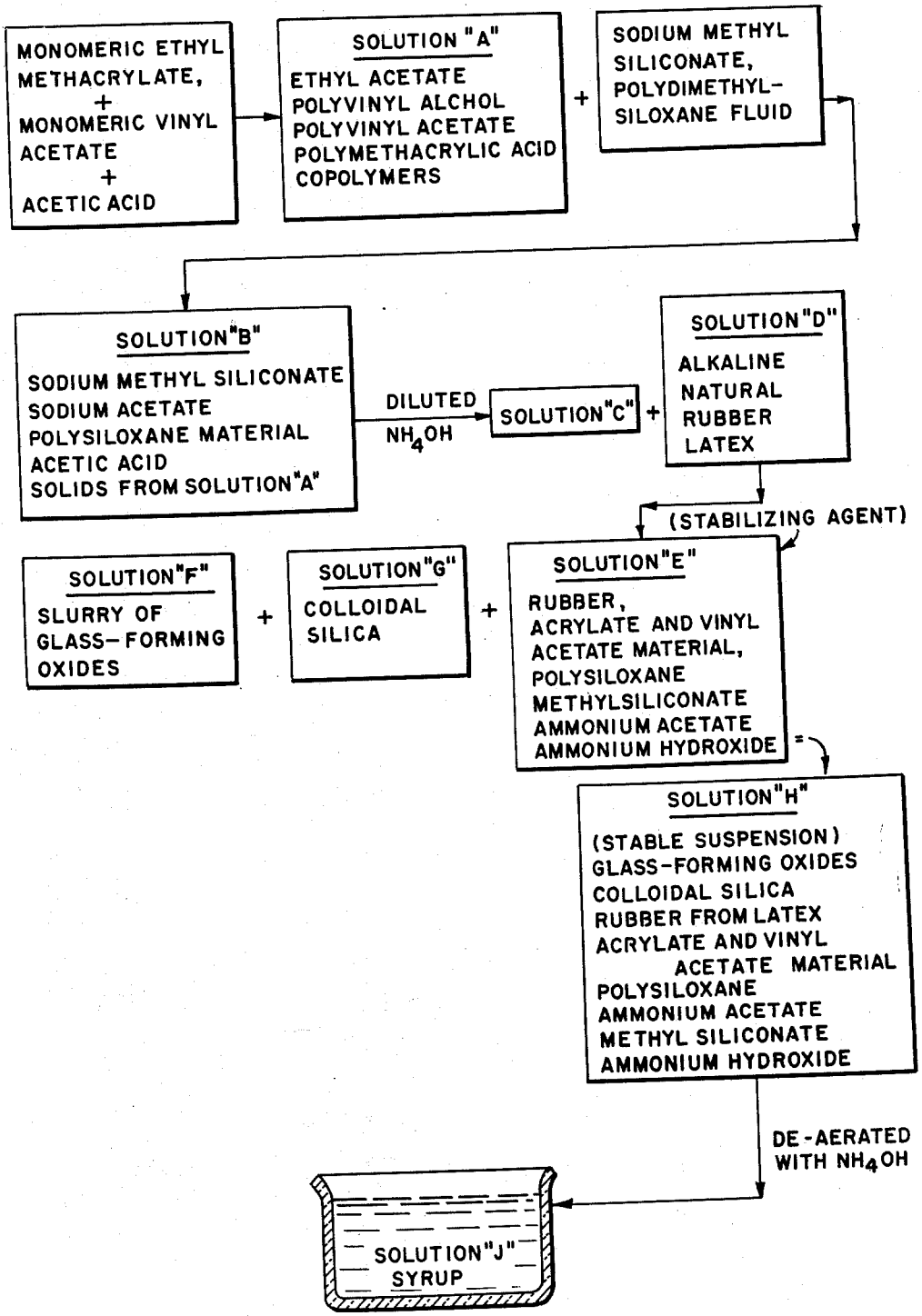

3,087,902
PREPARATION OF GLASS-LIKE MATERIALS FROM AQUEOUS SILICA SYSTEMS BY POLYMERIZATION AND CONTEMPORANEOUS DEHYDRATION
Jayanti Dharma Teja, Geneva, Switzerland, assignor to Montecatini-Societa Generale per l'Industria Mineraria e Chimica, Milan, Italy, a corporation of Italy
Filed Aug. 30, 1960, Ser. No. 52,811
9 Claims. (Cl. 260—4)

This invention relates to the preparation of high molecular weight materials, and more particularly to the preparation of glass-like materials from aqueous silica systems by polymerization and contemporaneous dehydration.

This application is a continuation-in-part of my copending application Serial No. 511,131, filed May 25, 1955. This application is also related to application Serial No. 511,132, now issued as Patent No. 2,908,545, and which is a division of said application Serial No. 511,131.

Heretofore many of the theories relating to crystallography and the solid state have assumed that the arrangement of particles in a crystal were as orderly as the arrangement of the atoms in a small organic molecule. Observations based on average properties have been interpreted as if all large molecules or aggregate were identical. In devising methods of preparing large molecules, previous workers have sometimes been influenced by such theories of orderliness.

Persons engaged in fields related to silicate chemistry have generally stressed the extreme insolubility of silica and the feasibilty of obtaining soluble silicates only by the use of strongly alkaline solutions. However, silica is soluble in pure neutral hot water to the extent of about 0.04% and a saturated aqueous solution of pure silica has characteristics, both biologically and chemically, which are distinguishable from pure water. Moreover, silica of small particle size can be dispersed in water.

In the development of the present invention, it was observed that much of the crystallographic observations can be correlated with a theory of close packing of aggregates having a random distribution of characteristics. It was also observed that the interfacial characteristics of a heterogeneous system could be modified by obtaining a dynamic balance between somewhat opposing tendencies, and that heterogeneous systems involving water soluble silica were especially responsive to a control of the characteristics of the interface in the heterogeneous systems.

Heretofore catalyst beads have been prepared by allowing a mixture of aqueous solutions comprising sodium silicate type of materials to mix in a stream which is transformed into a highly hydrated gelatinous mixture. By similar procedures, highly hydrated gelatinous filaments have been prepared previously from solutions of sodium silicate. In such procedures of forming high molecular weight material, the water of hydration of the lower molecular weight components is to a considerable extent incorporated in the higher molecular weight material.

In accordance with the present invention, water is desorbed during the increase in molecular weight, whereby relatively anhydrous or unhydrated higher molecular weight material is obtained. A theory of proton transfer is believed to account for the simultaneous dehydration and increase of molecular weight. A point charge can be introduced into certain aqueous systems prepared in accordance with the present invention, and a glass fiber withdrawn from the system. As the glass fiber is withdrawn from the solution, new glass is formed at the point of withdrawal of the glass fiber from the aqueous suspension, the glass being substantially completely dehydrated not by evaporation, but instantaneously by a chain reaction of proton transfer.

In the preferred method of preparing glass fibers in accordance with the present invention, three aqueous mixtures are prepared, one containing a mixture of glass forming (relatively insoluble in water) metal oxides (also commonly known as "hyalogenic" compounds), another a suspension of silica particles, and the third a transforming agent. Without the transforming agent, the mixture of suspended silica particles and metal oxides would tend to form a gelatinous composition quickly, but by reason of the transforming agent, only a part of the components are polymerized and the polymerization is arrested at a stage such that the transforming agent can keep the partially polymerized material suspended in the aqueous system as supended particles. This suspension can be tested by density gradient procedures to establish that the mixture is a complex system comprising water, soluble silica, particles of metal hydroxides, suspended silica particles, suspended metal oxide particles, suspended small particles of polymerization product of silica and metal oxides, buffering components, and transforming agent. In this suspension, there is a dynamic balance conveniently described as an equilibrium amongst components of different molecular weight. The transforming agent helps to hydrate the particles and to maintain the dynamic equilibrium. The glass fibers are formed by proton transfer, there being substantially simultaneous dehydration and molecular weight increase of the glass at the point of withdrawal.

Numerous embodiments of the invention are possible in invention. Thus, glass fibers can be prepared at moderate temperatures from aqueous systems. Proteins are prepared by the reaction of amino acids absorbed on silica particles. Flexible plasticized films of sodium silicate are prepared. Other materials are secured together by binders consisting predominantly of inorganic materials, employing aqueous systems in applying such binders. Thus, the invention is broader than any of the specific products to be prepared thereby.

Reference is made to a series of examples illustrating some of the chemistry and physics pertinent to the present invention.

EXAMPLE I

Mineral fibers having physical properties in some respects superior to those of glass fibers prepared from fused glass were prepared in accordance with the present invention. The glass fibers were drawn from a stabilized heterogeneous aqueous system briefly characterized as a syrup, having a composition which, except for the presence of appropriate stabilizing agents, would have a tendency to form a gel at room temperature. The particles suspended in water may be glass frit, metal oxides, or the like, but the dynamic equilibrium between the soluble and dispersed solids is more easily understood in connection with a dispersion of gelatinous globules. It is even possible to form systems in which relatively large particles of siliceous hydrosol (highly hydrated metal oxides having the quasi-solid characteristics of a gel, gelatinous paste, or the like) are dispersed in an aqueous solution of silica, the stabilizing agent preventing gelation but permitting ion exchange between the large and dissolved particles. Particular attention was directed to the preparation of the stabilizing agent.

Ethyl methacrylate and vinyl acetate were polymerized under the following conditions: Into a 500 ml. capacity flask having three necks and equipped with a stirrer, a thermometer and a refluxing condenser, there were introduced 36 g. of ethyl methacrylate, 0.36 g. of vinyl acetate, 80 ml. of water, 0.4 g. of ammonium persulfate, and 1.2 g. of sodium sulfosuccinate. Heating was effected for 6 hours at 52–55° C. until a latex was obtained. Then 70 g. of aqueous 35% glacial acetic acid was added to the latex so obtained and heating was effected at 82–85° C. for 2 hours. The products of this reaction are essentially vinyl acetate/ethyl methacrylate copolymer, the homopolymers which have formed in the reaction, and the products of acid hydrolysis (polymethacrylic acid, ethyl alcohol and polyvinyl alcohol). The resulting solution, identified as solution "A" contains about 30% of solid products and is employed as described below for the preparation of solution "B."

A mixture was prepared containing 85% of said solution A, 1⅓% of a commercial solution of sodium methyl siliconate, and 12% of a polydimethylsiloxane fluid having a viscosity of 1000 centistokes at 25° C. and corresponding to the commercial type of dimethyl silicone fluid as defined and whose preparation by conversion from chlorosilanes is described at pages 128 to 130 of the book Silicones by R. N. Meals and F. M. Lewis, Reinhold Publishing Corp., New York (1959), and more specifically corresponding to the product whose properties are listed in the fourth column of Table 2.2 entitled "Properties of Dimethyl Silicone Fluids," on page 20 of said book. This silicone fluid corresponds to those commercially known and is made up largely of mixtures of nonvolatile high molecular weight members, as discussed on page 21 of said book. Such silicone fluids are thermally, oxidatively, and hydrolytically stable. One of their most striking properties is that they show relatively little change in viscosity with change in temperature. The commercial solution of sodium methyl siliconate, also referred to herein as methyl siliconate material, contained about 22% $(CH_3SiO_{1.5})$ and 9.5% $Na_2O$, or about $32 \pm 2\%$ of $Na_3O_3SiCH_3$.

The mixture, obtained by mixing trade chemicals and designated solution B, contained

| | |
|---|---|
| Sodium methyl siliconate-commercial solution | 1.33 |
| Sodium acetate | .11 |
| Polysiloxane fluid | 12.00 |
| Acetic acid | 29.50 |
| The solids from solution A | 23.25 |
| Water (q.s.) | 33.92 |

Solution B was diluted with 25 volumes of water and then sufficient quantity of concentrated ammonium hydroxide was added rapidly with agitation to obtain a pH of 9.5. This was designated as solution C.

Solution C was combined with an alkaline dispersion of natural rubber latex designated as solution D, the mixture being solution E. Sufficient latex solution (solution D) to correspond, on a solids content basis, to 5 parts of solids, were added to sufficient solution C to correspond to 3 parts of solids to form 8 parts (solids basis) of solution E. The pH was kept constant at 9.5 by addition of ammonium hydroxide and agitation.

This mixture (solution E) had a composition corresponding approximately to:

| | Percent |
|---|---|
| Rubber from latex | 3.2 |
| Acrylate and vinyl material | 1.3 |
| Polysiloxane fluid | 0.65 |
| Methylsiliconate material | 0.072 |
| Ammonium acetate | 1.5 |
| Three percent aqueous ammonium hydroxide solution | 92.25 |

This mixture (solution E) can be conveniently designated as a stabilizing agent for a variety of systems.

A slurry was prepared from ground inorganic particles and water, and designated solution F. The particles, which had a mean particle size of 35 microns, and a range of about 4 to 120 microns, about 60% being about 30 to 40 microns, and constituting about 90% of the slurry, were well mixed with the 10% water of the slurry. A commercial grade of opacifying frit, such as employed in the manufacture of porcelain enamel, was utilized.

This ground mixture of glass-forming oxides was found to have an analysis as follows:

| | Percent |
|---|---|
| Zirconia | 45 |
| Zinc oxide | 22 |
| Boric oxide | 14 |
| Silica | 10 |
| Titania | 1.0 |
| Calcium fluoride | 3.3 |
| Aluminum oxide and magnesium oxide | 0.7 |
| Sodium oxide | 4.0 |

A colloidal solution of silica was prepared and designated as solution G. Acetic acid was reacted with a solution of sodium silicate containing about one half mole of silica per mole of sodium oxide, or corresponding approximately to the formula $Na_4SiO_4$. An aqueous solution containing 36.8% $Na_4SiO_4$ was reacted with an equal weight of glacial acetic acid to form a mixture containing 9% colloidal silica, and this was purified by dialysis, much of the sodium acetate being withdrawn, and leaving the colloidal silica suspension. The silica content of the colloidal solution (solution G) was about 9%, all of the silica being present in particles of less than about 1 micron in size. Although the diameters of the particles in solution G were only about ⅓₅ of the diameters of the particles of solution F, their volumetric size was only about 1/40,000 of the particles of solution F.

As a demonstration of the gelation characteristics of the mixture of the slurry of powdered metal oxides and the solution of colloidal silica, a volume of the slurry was added slowly to two volumes of the colloidal silica, and the mixture set to a substantially irreversible gelatinous sol within an hour.

By the use of the stabilizing agent (solution E) previously referred to, it was possible to prepare a solution retaining syrupy characteristics instead of being a gelatinous sol. Only less than about 2% of the stabilizing agent was necessary. The mixing of the slurry, the colloidal solution, and the stabilizing agent was conducted at about room temperature or about 70° F. Instead of adding the suspension or ground metal oxides to the colloidal silica solution, the colloidal solution of silica was added very rapidly, and with vigorous stirring, to half the volume of the slurry of ground glass-forming oxides (solution F), and immediately thereafter, while continuing the stirring, about 2% of the solution of the stabilizing agent (solution E) was added, thereby forming a mixture (solution H) having a composition about as follows:

| | Percent |
|---|---|
| Ground glass-forming oxides | 33.6 |
| Colloidal silica | 14.36 |
| Rubber (from latex) | 0.75 |
| Acrylate and vinylacetate material | 0.225 |
| Polysiloxane fluid | 0.113 |
| Ammonium acetate | 0.216 |
| Methyl siliconate | 0.012 |
| Three percent solution of aqueous ammonium hydroxide, q.s., about | 50.0 |

A very remarkable phenomenon occurred promptly after the mixing of three solutions F, G, and E. Within about 3 seconds, the mixture began to set to a gelatinous sol but instead of becoming a conventional gel, the material spontaneously reverted to a suspension within about 300 seconds, and thereafter was a stable suspension.

The mixture (solution H) was deaerated by bubbling the vapors of ammonium hydroxide through the mixture in a chamber having a pressure of about 700 mm. to form a spinning syrup (solution J).

Glass fibers were formed from solution J by a variety of procedures. In the simplest method, the point of a wood silver (i.e., a toothpick) was placed in the solution and slowly withdrawn, thereby forming a glass fiber longer than one inch. The glass was both formed and dehydrated at the point of withdrawal of the fiber from the solution.

By examination under the microscope, it was observed that some of the fibers had a larger diameter than others, the range being 1 micron to 8 microns, but that many of the fibers had a diameter slightly smaller than the 5 micron glass fibers employed in decorative textiles. The glass fibers prepared from the aqueous solution has a tensile strength of about 250,000 to 410,000 pounds per square inch. Numerous other measurements of the fibers demonstrated that they were in many respects as good as fibers prepared by the conventional extrusion of fused glass. Instead of having the tendency to abrade, as fused glass fibers would, the fibers formed from solution J had good surface characteristics, similar to those of a glass textile fabric after finishing to impart the feel and handle of an organic fabric. Under the stereoscopic binocular microscopic field, the fibers withdrawn from solution J were fully as transparent as fused fibers, and were perfect cylinders and thus shown to be truly of the glassy state as distinguished from being of a gelatinous nature.

*Properties of the Glass Fibers Prepared From Solution J*

| | |
|---|---|
| Color | Transparent. |
| Nature | Monofilaments. |
| Density | 2.58. |
| Diameter | Mean average 5 microns. |
| Tensile strength (dry and wet) | Range 250,000 to 410,000 p.s.i., mean average 310,000 p.s.i. |
| Young's modulus | $21 \times 10^6$. |
| Softening point | 1950° F. |

The valuable results obtained by the present invention are independent of the theory of operation. The explanation proposed for the phenomena is as follows:

Colloidal suspensions of silica, containing particles of silicic acid $Si(OH)_4$, of diameters in the range 10 to 100 millimicrons, consist of amorphous silica particles with a high degree of surface hydration. As the particle size increases the degree of hydration decreases. The mechanism of growth is not well understood but should involve hydration and dehydration mechanisms. When colloidal silica, prepared from sodium metasilicate by acid hydrolysis, followed by dialysis, is induced to polymerize into high molecular weight polysilicic acid, the large particles of suspensoid that are formed tend to flocculate, sometimes forming threads and fibrils. This phenomenon can be traced to charge neutralization of the polysilicic acid nuclei. If in a colloidal silica medium, a metal oxide like FeO or CaO or $ZrO_2$ is suspended, and the pH is brought close to the point where the metal oxide tends to form the hydroxide, the metal ion enters the polysilicic acid aggregate. This could create structures like

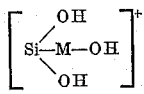

or

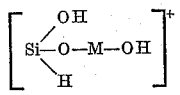

Such admission of metal ions at random into the polysilicic acid structure could take place preferentially under certain optimum conditions as embodied in the invention. Simultaneously absorption of the metal ions could take place on the surface of the polysilicic acid particle thereby creating a more complex structure. Silicate glass may be produced by the coalescence of such particles in a true monofilament form.

In a suspension of mineral oxides, and colloidal silica, a network of polysilicic acid aggregates of the above kind may be created by addition of particular materials which tend to partially polymerize the silicic acid molecules and then arrest the polymerization reaction at a certain degree of polymerization, by tending to solubilize the resultant polymer molecules. In such a system, the individual particles may be held together in a network by complex interfacial absorption phenomena which could be termed hydrogen bond formation. Alternately such systems could facilitate a high degree of proton transfer from particle to particle. Such proton transfer if induced by charge neutralization or reversal at any one point in the system, could result in a coalescing of the individual particles, through a process of dehydration in which hydrogen ion (proton) carries away with it, during the process of transfer, the surface water of hydration or $OH^-$ groups as $H^+(HOH)_n$. This could result in Si—O—Si bonds being formed between individual particles of the system. This necessarily happens in a 3-dimensional way. Hence, if the point of charge neutralization is moved out of the system in a unidirectional fashion, a monofilament of silicate glass is formed.

EXAMPLE II

Glass fibers are prepared by extruding solution J (Example I) through a metallic orifice into an electrostatic field, whereby the electrostatic field helps to impose an elongating force upon the fiber as it is formed.

EXAMPLE III

Various modifications are made in the formulation of the various reactants and components utilized in preparing a spinning bath. It is desirable to utilize a very high molecular weight organic material dispersible in either alkaline or acidic aqueous systems, but animal glue, polyvinyl alcohol, polyethyleneimine, copolymers of styrene and maleic acid and related material can sometimes serve instead of vinyl and acrylate materials. Best results are obtained with materials which by intrinsic viscosity measurements possess an average molecular weight in excess of 10,000 to 100,000, and which contain a sufficient number of water solubilizing groups to provide one water solubilizing group per 80 of molecular weight.

Formic acid, propionic acid, nitrous acid, and other acidic materials can be employed instead of acetic acid in the preparation of the dispersion of high molecular weight material. Similarly volatile bases, such as methyl amine, ethylene diamine, and piperazine can be employed instead of ammonia.

Instead of using exactly 1⅓% methyl siliconate in the preparation of solution B, a wide range of concentrations is effective. Noticeable results are obtained using as little as 0.5% SC–50 (a commercial grade of sodium methyl siliconate) and larger amounts up to 10% can be utilized with little disadvantage other than the cost thereof. In modifying the interfacial characteristics of heterogeneous silica systems, organosiliconic acids and their salts possess remarkable advantages and flexibility. Just as emulsifying agents are among the important aids for stabilizing oil in water suspensions, so are the organosiliconic acids among the important aids for stabilizing suspensions of silicates. Potassium methyl siliconate may be used instead of the sodium salt. Salts of ethyl siliconic acid, isopropylsiliconic acid, and even phenylsiliconic acid and other organosiliconic acids are of interest, but are generally less effective than the corresponding methyl siliconates. The alkaline hydrolysis products of diorgano polysiloxanes, although helpful supplements, are not suitable substitutes for the organosiliconates. None of the sodium silicates or water soluble silicates, even though present in relatively large amounts, can provide the modification of the interface of a silica particle and water which characterizes the organosiliconates. Other low molecular weight organosilicon compounds stable at a pH of about 13 are of some value in combination with organosiliconates.

Instead of using 1000 centistoke polydimethylsiloxane fluid in the preparation of solution B, a variety of relatively high viscosity, relatively high molecular weight, relatively hydrophobic materials may be utilized. The copolymer formed by subjecting substantially equal parts of hexamethyltrisiloxane, terephthalic acid, and sorbitol to elevated temperature under acidic polymerization conditions is suitable. Other copolymers or alkyds, phenolic resins and silicones are suitable. The commercially available resins characterized as alkyd-silicone copolymers are suitable.

Advantages are obtained by utilizing a mixture of generally antagonistic components, whereby each component is able to assert its function in a balanced heterogeneous system. By the use of larger quantities of organic materials, somewhat similar results are attainable using copolymers designed to possess physical properties similar to the mixtures. Copolymers may be designed to possess physical properties similar to the mixtures. Copolymers of acrylic acids and esters and silicones, or vinyl alcohol, alkyds, silicones, and vinylsiliconates, and other appropriate combinations might be useful in preparing a stabilizing agent capable of making an inorganic gel spontaneously revert to a stable suspension suitable for spinning of inorganic glass fibers.

In preparing solution B from a mixture of high molecular weight organic materials, it is important to control the proportions in such a manner that solution B is a syrupy suspension in strongly acid or strongly alkaline media, but has a much higher viscosity, approaching that of a hydrogel, at neutral pH. Ordinarily this result is obtained by the use of slightly more high molecular weight hydrophilic material than silicone material.

Synthetic rubber dispersions can be employed instead of natural rubber latex in preparing solution D. Copolymers of vinyl chloride and acrylonitrile, copolymers of butadiene and acrylonitrile, compositions consisting predominantly of Hycar rubber, commercially available dispersions such as vinyl or vinylidene chloride resins, dispersions of starch ethers, starch esters, butyl acrylate dispersions, and related materials, are suitable for the preparation of solution D. In general, solution D must contain an organic material having an average molecular weight of at least 5,000 and a molecular weight of at least 200 per water solubilizing group. Thus, solution D is a dispersion of a hydrophobic material, as distinguished from solution A, which is a dispersion of a hydrophilic material having a molecular weight greater than about 10,000, and having a water solubilizing group for each molecular weight of about 80, and capable of remaining in aqueous suspension as a syrup at either strongly alkaline or strongly acidic conditions, but tending to form a gelatinous material at neutral pH. In the preparation of solution F and again in the preparation of solution H, the composition is such that gelatinous materials can be obtained unless the speed of mixing, order of mixing, and temperature are properly controlled to obtain compositions which are stable dispersions instead of gels.

In preparing solution F, it is important to control the particle size of the metal oxides within the range of from about 4 to 120 micron size, preferably within the range of from about 30 to 40 micron size. The spinning solution (solution J) must contain from about 15% to 75% solids of the metal oxides derived from solution F. Any of the metal oxides customarily used in glassmaking can be utilized, but in order to form high strength glass fibers, it is important to control the concentration of sodium oxide, potassium oxide, lithium oxide, and related alkaline oxides to small amounts, desirably less than 4% of the metal oxide composition, and certainly less than 10%. Other components can vary with even greater flexibility than is possible in conventional glass making. Substantially pure silica fibers can be prepared, but the cost of grinding pure silica to the correct particle size, desirably 35–50 microns, is greater than the cost of grinding other metal oxides. It is commercially convenient to utilize glass frit, such as employed in manufacturing porcelain enamel, but it is not necessary to preform the glass. Instead, the separate metal oxides, such as zirconia and titania can be ground to the correct particle size and mixed to form the spinning solution. The glass fibers formed from a properly well-prepared spinning solution have a composition resulting from the components used.

EXAMPLE IV

Batts of glass fibers are sprayed with a solution prepared by mixing five parts of water with solution J of Examples I or III. After the evaporation of the water, the batts are firmly bound together, there being tiny agglomerates of material at some of the points where the glass fibers intersect. Instead of having the fire hazard attributable to the use of organic binders, or the inflexibility and stiffness of binders consisting only of sodium silicate, the batts have highly desirable flexible characteristics.

EXAMPLE V

A film is formed by allowing a sample of solution I (Examples I or III) to evaporate from a silicone resin surface. A flexible film of predominantly inorganic material results. In modifications of this film forming procedure, mixtures of sodium silicate and solution E (whether prepared in accordance with Example I or III) were utilized, and a variety of flexible inorganic films were prepared.

Obviously many other modifications of the pioneer invention are possible, and the above examples merely illustrate some of the advantageous results from preparing high molecular material by the use of the present invention.

EXAMPLE VI

A gypsum partition block is coated with sufficient solution H of Examples I or III to correspond to about a 300 micron film of said solution H. A somewhat impervious glass like protective coating remains after the volatile components have evaporated. Four layers of solution H are applied at one hour intervals. A tough glass like protective coating is thus imparted to the gypsum block, converting it to a block having a weather resistance comparable to a glazed brick.

A gypsum roof deck, treated in a similar manner, provides a weatherproof roof. Concrete blocks and other materials beneficiated by weatherproofing are given a glass-like protective coating in this manner. Shower stalls, bath tubs, and other porcelain-enamel protected metals, in which a portion of the enamel is chipped away, are repaired at room temperature by the application of successive thin films of the suspensions of the mixture of positively charged insoluble inorganic particles and negatively charged silicic acid particles of solution H.

Obviously many other modifications of the invention are possible, and the above examples merely illustrate some of the advantageous results from preparing high molecular weight material by the use of the present invention.

I claim:

1. The method of preparing a spinning and coating syrup composition of high molecular weight glass-like materials which includes the steps of: preparing an aqueous system saturated with colloidal silica, all of the silica being present in particles of less than one micron in size, adding less than 2% of a stabilizing agent comprising an aqueous dispersion of about 1.3% of a solid reaction product prepared by taking about 36 parts by weight of ethyl methacrylate, about 0.36 part vinyl acetate, about 0.4 part ammonium persulfate and about 1.2 parts sodium succinate, reacting the mixture in an aqueous medium at about 52–55° C. to form a latex and then reacting the latter with about 70 parts of aqueous 35% acetic acid solution so that it is copolymerized until the mixture contains approximately 30% by weight of solid reaction products; about 0.65% polydimethylsiloxane fluid having a viscosity of 1000 centistokes at 25° C., about 0.072% methyl siliconate material comprising a methyl siliconate selected from the group of sodium and potassium methyl siliconate, about 1.5% ammonium acetate, and about 92.25% of a three percent aqueous ammonium hydroxide solution, adding an aqueous slurry containing dispersed particles of glass-forming oxides having maximum dimensions within the range from about 4 to 120 microns and having an affinity for absorption on colloidal silica particles; adjusting the acidity of the aqueous system to a pH value greater than 7, whereby the oxide just starts to flocculate in the form of the hydroxide.

2. A composition of matter consisting essentially of water, soluble silica in an amount sufficient to saturate the water, from 0.1 to 10% by weight colloidal siliceous particles having a particle size of less than one micron, from 5 to 75% by weight of glass-forming oxide particles having a particle size from 5 to 100 microns, and an amount of stabilizing agent less than 2% by weight of said oxide particles, said stabilizing agent comprising an aqueous dispersion of about 3.2% rubber from latex, about 1.3% of a solid reaction product prepared by taking about 36 parts by weight of ethyl methacrylate, about 0.36 part vinyl acetate, about 0.4 part ammonium persulfate and about 1.2 parts sodium succinate, reacting the mixture in an aqueous medium at about 52–55° C. to form a latex and then reacting the latter with about 70 parts of aqueous 35% acetic acid solution so that it is copolymerized until the mixture contains approximately 30% by weight of solid reaction products; about 0.65% polydimethylsiloxane fluid having a viscosity of 1000 centistokes at 25° C., about 0.072% methyl siliconate material consisting essentially of a methyl siliconate of at least one alkali metal of the group consisting of sodium and potassium, about 1.5% ammonium acetate, and about 92.25% of a three percent aqueous ammonium hydroxide solution.

3. A composition suitable for the preparation of glass fibers at temperatures below 100° C., said composition consisting of from 0.1 to 10% by weight colloidal siliceous particles having a particle size of less than one micron, from 5 to 75% by weight of glass-forming oxide particles having a particle size within the range from 30 to 40 microns, and an amount of stabilizing agent less than 2% by weight of the oxide particles, said stabilizing agent comprising about 3.2% rubber from latex, about 1.3% of a solid reaction product prepared by taking about 36 parts by weight of ethyl methacrylate, about 0.36 part vinyl acetate, about 0.4 part ammonium persulfate and about 1.2 parts sodium succinate, reacting the mixture in an aqueous medium at about 52–55° C. to form a latex and then reacting the latter with about 70 parts of aqueous 35% acetic acid solution so that it is copolymerized until the mixture contains approximately 30% by weight of solid reaction products, about 0.65% polydimethylsiloxane fluid having a viscosity of 1000 centistokes at 25° C., about 0.072% methyl siliconate material comprising a methyl siliconate selected from the group of sodium and potassium methyl siliconate, about 1.5% ammonium acetate, and about 92.25% of a three percent aqueous ammonium hydroxide solution.

4. A liquid, low viscosity composition suitable for the preparation of glass fibers at temperatures below about 100° C. consisting essentially of water, ammonium hydroxide, colloidal silica, glass-forming oxide particles, and a stabilizing agent, the stabilizing agent constituting less than 2% by weight of the quantity of said oxide particles present and comprising an aqueous dispersion of about 3.2% rubber from latex, about 1.3% of a solid reaction product prepared by taking about 36 parts by weight of ethyl methacrylate, about 0.36 part vinyl acetate, about 0.4 part ammonium persulfate and about 1.2 parts sodium succinate, reacting the mixture in an aqueous medium at about 52–55° C. to form a latex and then reacting the latter with about 70 parts of aqueous 35% acetic acid solution so that it is copolymerized until the mixture contains approximately 30% by weight of solid reaction products; about 0.65% polydimethylsiloxane fluid having a viscosity of 1000 centistokes at 25° C., about 0.072% methyl siliconate material consisting essentially of a methyl siliconate of at least one alkali metal of the group consisting of sodium and potassium, about 1.5% ammonium acetate, and about 92.25% of a three percent aqueous ammonium hydroxide solution, the colloidal silica being present in a greater quantity than the stabilizing agent, and the glass-forming oxide particles being present in a greater quantity than the colloidal silica.

5. The method of preparing a spinning and coating syrup composition of high molecular weight glass-like materials which includes the steps of preparing a saturated aqueous colloidal suspension of silica, all of said silica being present in particles of less than 1 micron in size, combining during vigorous stirring at a temperature of about 70° F. two volumes of said colloidal suspension of silica with about one volume of an aqueous slurry consisting of about 3.3% calcium fluoride, the balance of the solids of said slurry being ground glass-forming oxides, adding about 2% of a stabilizing agent consisting of about 3.2% alkaline natural rubber latex, about 1.3% of a solid reaction product prepared by taking about 36 parts by weight of ethyl methacrylate, about 0.36 part vinyl acetate, about 0.4 part ammonium persulfate and about 1.2 parts sodium succinate, reacting the mixture in an aqueous medium at about 52–55° C. to form a latex and then reacting the latter with about 70 parts of aqueous 35% acetic acid solution so that it is copolymerized until the mixture contains approximately 30% by weight of solid reaction products; about 0.65% polydimethylsiloxane fluid having a viscosity of 1000 centistokes at 25° C., about 0.072% methyl siliconate material comprising a methyl siliconate selected from the group of sodium and potassium methyl siliconate, about 1.5% ammonium acetate, and about 92.95% of a three percent aqueous ammonium hydroxide solution, maintaining the resulting mixture at room temperature of about 70° F. until a stable suspension forms, and de-aerating said stable suspension by bubbling vapors of ammonium hydroxide therethrough in a chamber having a pressure of about 700 mm. until a spinning syrupy composition of high molecular weight siliceous material is formed.

6. A spinning solution composition suitable for the preparation of glass-like fibers at moderate temperatures, consisting essentially of about 33.6% ground glass-forming oxides, about 14.36% colloidal silica, about 0.75% alkaline natural rubber latex, about 0.225% of a solid reaction product prepared by taking about 36 parts by weight of ethyl methacrylate, about 0.36 part vinyl acetate, about 0.4 part ammonium persulfate and about 1.2 parts sodium succinate, reacting the mixture in an aqueous medium at about 52–55° C. to form a latex and then reacting the latter with about 70 parts of aqueous 35% acetic acid solution so that it is copolymerized until the mixture contains approximately 30% by weight of solid reaction products; about 0.113% polydimethylsiloxane fluid having a viscosity of 1000 centistokes at 25° C., about 0.216% ammonium acetate, about 0.12% methyl siliconate material comprising a methyl siliconate selected from the group of sodium and potassium methyl siliconate, and about 50% of a three percent solution of aqueous ammonium hydroxide solution.

7. A composition according to claim 6, said ground glass-forming oxides ingredient including about 45% zirconia, about 22% zinc oxide, about 14% boric oxide, about 10% silica, about 1% titania, about 0.7% aluminum oxide and magnesium oxide, and about 4% sodium oxide.

8. An article comprising a structure having thereon at least one layer of the dried coating composition prepared in accordance with the method of claim 1.

9. The article of claim 8 wherein the structure comprises a batt of glass fibers.

References Cited in the file of this patent

UNITED STATES PATENTS 2,908,545    Teja ------------------ Oct. 13, 1959